(12) United States Patent
Takahashi et al.

(10) Patent No.: US 10,958,801 B2
(45) Date of Patent: Mar. 23, 2021

(54) IMAGE SCANNING APPARATUS WITH DIRT DETECTION AND REMOVAL OF INFLUENCE OF THE DIRT

(71) Applicant: FUJI XEROX CO., LTD., Tokyo (JP)

(72) Inventors: Hidemasa Takahashi, Kanagawa (JP); Fumihito Kasai, Kanagawa (JP); Atsuhiro Itoh, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/664,958

(22) Filed: Oct. 28, 2019

(65) Prior Publication Data
US 2020/0344374 A1 Oct. 29, 2020

(30) Foreign Application Priority Data
Apr. 24, 2019 (JP) .............................. JP2019-083324

(51) Int. Cl.
*H04N 1/00* (2006.01)

(52) U.S. Cl.
CPC ..... *H04N 1/00909* (2013.01); *H04N 1/00037* (2013.01); *H04N 1/00082* (2013.01); *H04N 1/00798* (2013.01)

(58) Field of Classification Search
CPC ........... H04N 1/00909; H04N 1/00037; H04N 1/00082; H04N 1/00798; G03G 15/5008
See application file for complete search history.

(56) References Cited

U.S. PATENT DOCUMENTS

| 2005/0179954 A1* | 8/2005 | Arai | ...................... H04N 1/4097 358/3.26 |
| 2015/0070729 A1* | 3/2015 | Osada | .................. H04N 1/2307 358/1.18 |

FOREIGN PATENT DOCUMENTS

| JP | 2010-220133 | | 9/2010 | |
| JP | 2010220133 | * | 9/2010 | ............... G06T 1/00 |

* cited by examiner

*Primary Examiner* — Iriana Cruz
(74) *Attorney, Agent, or Firm* — JCIPRNET (57) ABSTRACT

An image scanning apparatus includes: a reading unit that reads image data, which includes an image of a document transported along a transport path and an image at a scanning position of the image, from a storage area in synchronization with a reading synchronization signal; a detection unit that detects a dirt at the scanning position by processing the image data; and a delay unit that delays and outputs a period, during which the synchronization signal to be provided to the detection unit is valid, until reading of data of a document part included in the image data starts.

8 Claims, 7 Drawing Sheets

IMAGE SCANNING APPARATUS WITH DIRT DETECTION AND REMOVAL OF INFLUENCE OF THE DIRT

CROSS-REFERENCE TO RELATED APPLICATIONS

This application is based on and claims priority under 35 USC 119 from Japanese Patent Application No. 2019-083324 filed Apr. 24, 2019.

BACKGROUND

(i) Technical Field

The present invention relates to an image scanning apparatus.

(ii) Related Art

A method of using an automatic document transport apparatus is one of methods for scanning an image of a document. In the method, the image of the document is scanned while the document passes a scanning position. In this case, in a case where the scanning position is dirty, a pattern which does not exist in the document is superimposed on the scanned image. For example, black stripe lines appear. Here, an image at the scanning position is acquired immediately before the scanning of the image of the document starts, and existence or non-existence of dirt is detected.

JP2010-220133A is an example of the related art.

SUMMARY

There is a case where it is desired to perform a process for detecting dirt and removing influence of the dirt by once storing an image at a scanning position and an image of a document as one image data in a storage area, and, thereafter, reading the image data from the storage area. In this case, the reading of the image data from the storage area starts based on a reading synchronization signal. Here, the reading synchronization signal is output in units of image data. Therefore, the image data at the scanning position appears at a head of a period during which the reading synchronization signal is valid. The image data is used to detect the dirt.

However, a module, which detects dirt at a reading position, uses data of a period, during which the scanning synchronization signal is invalid, as a processing target. Therefore, in a case where the reading synchronization signal is provided to the module which detects the dirt at the reading position without change, it is not possible to detect the dirt of the reading position.

Aspects of non-limiting embodiments of the present disclosure relate to an image scanning apparatus that is capable of detecting the dirt which is not available to be detected in a case where the reading synchronization signal, which provides a timing at which the image data from the storage area is read, is provided to the module which detects the dirt at the scanning position without change, in a case where, after the image at the scanning position and the image of the document are stored as one image data in the storage area, the image data which is read from the storage area is provided to the module which detects the dirt at the scanning position.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image scanning apparatus including: a reading unit that reads image data, which includes an image of a document transported along a transport path and an image at a scanning position of the image, from a storage area in synchronization with a reading synchronization signal; a detection unit that detects a dirt at the scanning position by processing the image data; and a delay unit that delays and outputs a period, during which the synchronization signal to be provided to the detection unit is valid, until reading of data of a document part included in the image data starts.

BRIEF DESCRIPTION OF THE DRAWINGS

Exemplary embodiment(s) of the present invention will be described in detail based on the following figures, wherein:

FIG. 7 is a diagram illustrating an example of image processing performed by the image scanning control unit which is used in an exemplary embodiment. A part (A) of FIG. 7 illustrates an image signal provided from a light reception unit, a part (B) of FIG. 7 illustrates scan image data, which is treated in a memory input module, and a writing page sync signal, a part (C) of FIG. 7 illustrates the scan image data written in the memory, a part (D) of FIG. 7 illustrates scan image data, which is treated in a memory output module, and a reading page sync signal, a part (E) of FIG. 7 illustrates image data, which is output by a synchronization signal control unit, and a delay page sync signal, a part (F) of FIG. 7 illustrates image data which is output by a dust detection module, and a part (G) of FIG. 7 illustrates image data which is output by an image processing module.

DETAILED DESCRIPTION

Hereinafter, exemplary embodiments of the present invention will be described with reference to the accompanying drawings.

Whole Configuration

Figure 1:
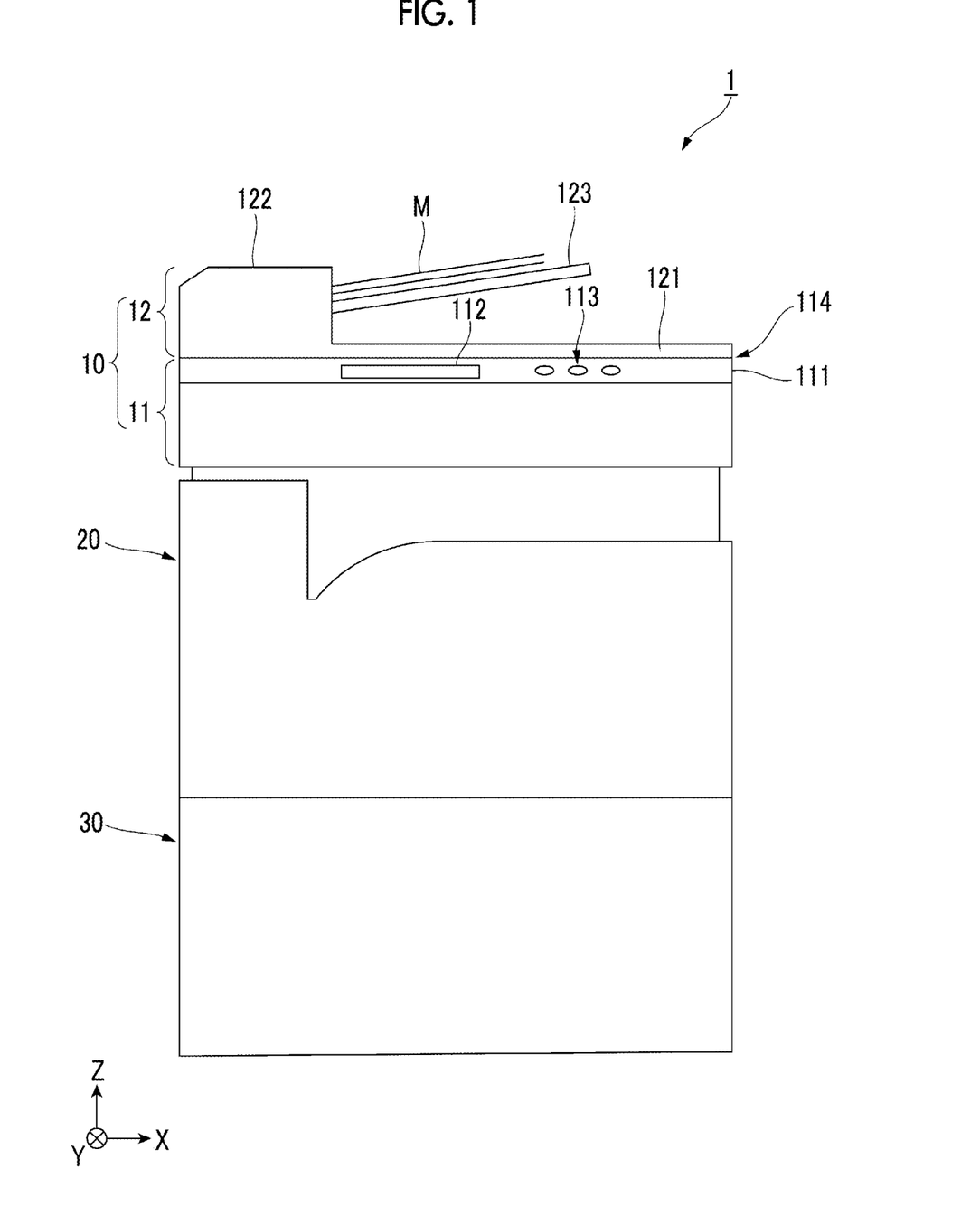
FIG. 1 is a diagram illustrating an example of an appearance of an image forming apparatus including a mechanism which optically scans information from a document transported at a fixed speed.

FIG. 1 is a diagram illustrating an example of an appearance of an image forming apparatus 1 including a mechanism which optically scans information from a document transported at a fixed speed.

Here, the image forming apparatus 1 is an example of an image scanning apparatus.

The image forming apparatus 1 illustrated in FIG. 1 includes a document scanning device 10 that scans information of a document M, an image recording device 20 that records an image on paper or another medium, and an accommodation device 30 that includes a mechanism which extracts the medium one by one and supplies the medium to the image recording device 20.

In a case of the image forming apparatus 1 illustrated in FIG. 1, the document scanning device 10 is attached to an upper surface of the image recording device 20 and the image recording device 20 is attached to an upper surface of the accommodation device 30. The image recording device 20 and the accommodation device 30 are connected through a not-shown path through which the medium, such as the paper, is transported.

The document scanning device 10 illustrated in FIG. 1 includes a main body 11 that is embedded with an optical system which scans the information of the document M and a control unit which controls a scanning operation, and a document transport device 12 that transports the document M one by one at the fixed speed. The document transport device 12 and the main body 11 are connected through a hinge provided on a back surface side. That is, the document transport device 12 is attached to the main body 11 to be able to open.

A manipulation reception unit 111 is disposed on a front surface of the main body 11. In the manipulation reception unit 111, a touch panel 112 and a plurality of manipulation buttons 113 are disposed. The touch panel 112 is used to display a manipulation menu, a message, or the like, and is used to receive an instruction of a user.

In a case of the exemplary embodiment, the front surface of the main body 11 is referred to as a part to which the user approaches for manipulation, and is referred to as a front side in a case of being viewed from the user who is performing the manipulation. In addition, a back surface of the main body 11 is a part on an inner side viewed from the user.

On an upper surface of the main body 11, a document stand 114, which is formed of a material through which light passes, is provided. For example, transparent and colorless glass is used as the material of the document stand 114. The document stand 114 is used in a case where information is scanned in a state in which the document M stops.

The document transport device 12 includes a document cover 121 that covers an entirety of the upper surface of the main body 11 in a closed position, an automatic document transport unit 122 that transports the document M up to a not-shown scanning position and discharges the document M after scanning is performed, and a document tray 123 that accommodates the document M before the document M is transported by the automatic document transport unit 122.

A surface of the document cover 121, which is on an opposite side of the document stand 114, is used as a spot which accommodates the document M which is discharged from the automatic document transport unit 122 after the scanning is performed.

The image recording device 20 is embedded with, for example, an already-known mechanism for recording a toner image on a surface of the medium using an electrographic method. In a case of the exemplary embodiment, the image recording device is capable of performing recording using four colors including yellow, magenta, cyan, and black. Data of an image to be recorded is provided from, for example, the document scanning device 10. First of all, the data of the image to be recorded may be provided through a Local Area Network (LAN) or a Universal Serial Bus (USB), or may be provided from a semiconductor memory installed in an insertion port.

For example, in a case where it is desired to scan the information of the document M in the document scanning device 10, the user selects any of a method for scanning the information of the document M placed on the document stand 114 in a state in which the document M is placed on the document stand 114, and a method for scanning the information of the document M while automatically transporting the document M placed on the document tray 123.

In a case where the user instructs to start the scanning after placing the document M on any position, an operation of scanning the document M starts. That is, the information of the document M is scanned by the document scanning device 10.

The scanned information is output to the image recording device 20 from the document scanning device 10 through a not-shown signal line. The image recording device 20 records an image corresponding to the information received from the document scanning device 10 on the medium, such as the paper, and discharges the medium to a discharge tray.

Configuration of Document Scanning Device

Figure 2:
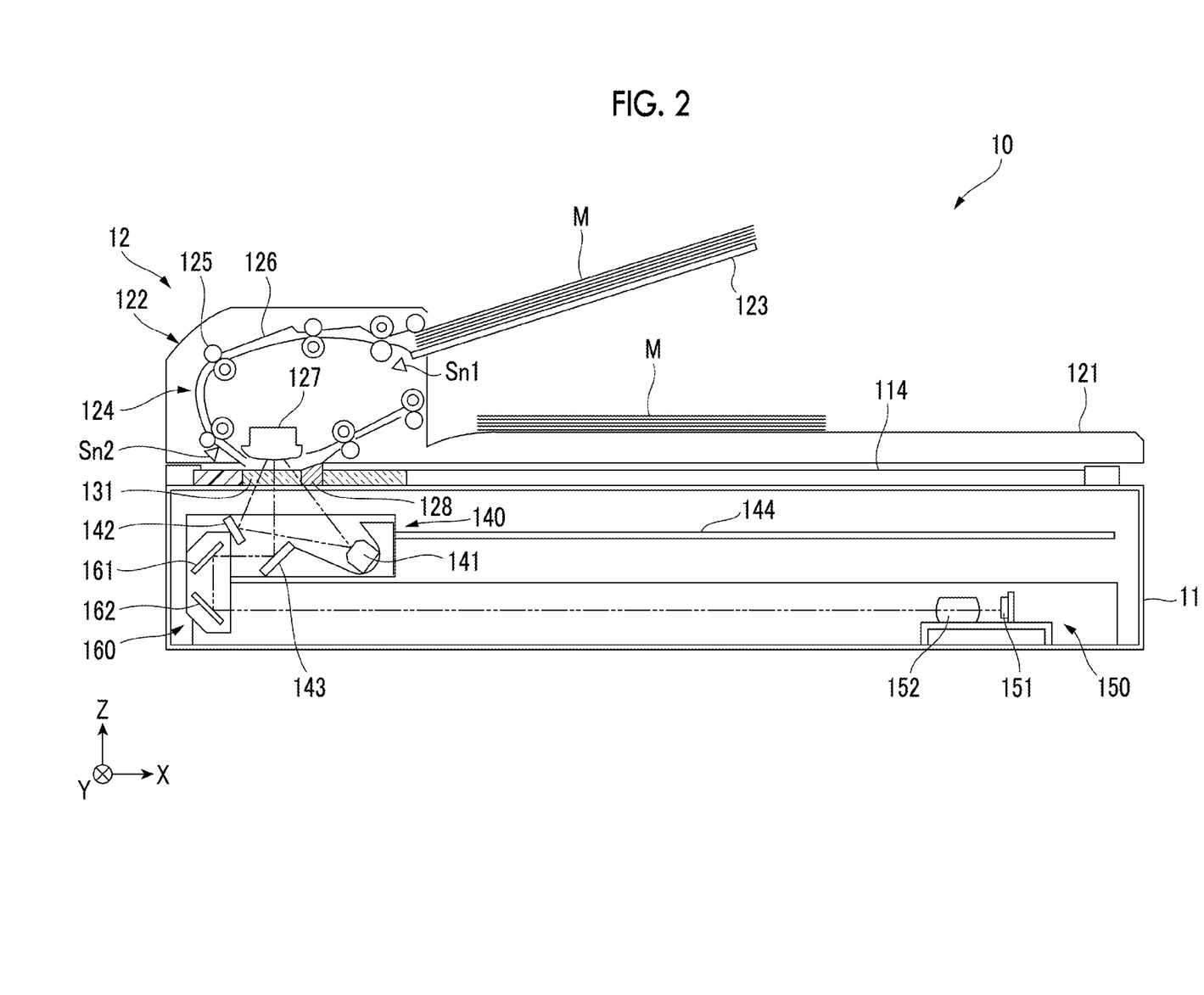
FIG. 2 is a diagram illustrating a schematic configuration of a document scanning device.

FIG. 2 is a diagram illustrating a schematic configuration of the document scanning device 10.

The document scanning device 10 corresponds to two types of scanning modes. One scanning mode is a mode in which the information is scanned from the document M transported in the automatic document transport unit 122, and another scanning mode is a mode in which the information is scanned from the document M in a stop state in which the document M is placed on the document stand 114.

The scanning mode to be used is selected by the user.

Scanning windows dedicated to respective scanning modes are provided on the upper surface of the main body 11 of the document scanning device 10.

One scanning window is the above-described document stand 114. Another scanning window is a scanning window 131 which is disposed at a position in which the upper surface of the main body 11 is superimposed on a path through which the document M is transported by the automatic document transport unit 122.

Here, the position in which the scanning window 131 is disposed is an example of a scanning position of the information of the document M transported at the fixed speed. In a case of the exemplary embodiment, a transparent and colorless glass plate is used as the scanning window 131.

An inside of the main body 11 is provided with an illumination unit 140 which emits light illuminating the document M, and a light reception unit 150 which receives light reflected in the document M.

FIG. 2 illustrates a main path, through which light emitted from the illumination unit 140 travels, using a two-dot chain line.

The illumination unit 140 is also referred to as a carriage, and, on an inside thereof, is provided with a light source 141, a reflection plate 142 that reflects apart of light (hereinafter, referred to as "illumination light") emitted from the light source 141 in a direction of the scanning window, and a reflection plate 143 that folds an optical path of light (hereinafter, referred to as "reflected light") reflected on the document M or the like and leads the light to the light reception unit 150.

Movement of the illumination unit 140 is guided by a rail 144 which is attached to be parallel to an X direction. In a case of the exemplary embodiment, the illumination unit 140 is attached to the rail 144 so as to reciprocate in the X direction.

In a case of FIG. 2, the X direction is a direction which is approximately parallel to a surface of the document stand 114, and is a direction in which the document M transported by the automatic document transport unit 122 passes the scanning window 131. The X direction of the exemplary embodiment corresponds to scanning direction or a sub-scanning direction. Incidentally, a Y direction perpendicular to the X direction is referred to as a main scanning direction.

In a case of the exemplary embodiment, the light source 141 is a line-type Light Emitting Diode (LED) array in which a plurality of LED chips are arranged on a substrate in a straight line shape. Here, the LED chips are arranged in parallel to the Y direction. Therefore, light which is emitted from the illumination unit 140 is linear light which is approximately parallel to the main scanning direction. In other words, the light source 141 emits the linear illumination light.

In a case of the exemplary embodiment, a part of the linear illumination light is output in a direction of the scanning position which will be described later. However, another part is output in a direction of the reflection plate 142. The illumination light which is incident to the reflection plate 142 is reflected in the direction of the scanning position.

It is possible to adjust a quantity of light of the light source 141 of the exemplary embodiment. For example, it is possible to adjust a quantity of light by varying a ratio of time in which lighting is on in a blinking period of the LED chips. The time in which lighting is on is also referred to as ON time.

A position of the illumination unit 140 in the main body 11 is determined according to the scanning mode.

For example, in a case of the scanning mode in which the information is scanned from the document M that is being transported by the automatic document transport unit 122, the illumination unit 140 is positioned at a lower part of the scanning window 131 provided in a position which faces a lower surface of the automatic document transport unit 122. In the case of the scanning mode, the illumination unit 140 stops at a determined position or is maintained in a stop state during the scanning. The scanning window 131 has a slender shape in the main scanning direction.

In contrast, in a case of the scanning mode in which the information is scanned from the document M disposed on the document stand 114, the illumination unit 140 is moved in the sub-scanning direction such that the illumination light emitted from the light source 141 scans a whole surface of the document M. In the case of the scanning mode, the document M is in the stop state and the illumination unit 140 relatively moves with respect to the document M.

In both the scanning modes, the movement of the illumination unit 140 is guided along the rail 144.

Light reflected in the reflection plate 143 of the illumination unit 140 passes the reflection unit 160, which includes reflection plates 161 and 162, and is introduced to the light reception unit 150. The reflection unit 160 performs a role of folding back light, which is incident from the reflection plate 143, in an opposite direction. In a case where the information is scanned from the document M disposed on the document stand 114, the reflection unit 160 moves in the sub-scanning direction so as to be interlocked with the illumination unit 140. However, a length of movement of the reflection unit 160 is controlled such that a length of an optical path is fixed until the light reflected in the document M reaches the light reception unit 150.

The light reception unit 150 includes an imaging element 151 that receives the reflected light from the document M or the like, and an image forming lens 152 that forms an image using the reflected light from the document M or the like and leads the formed image to the imaging element 151. For example, a charge coupled device sensor is used as the imaging element 151. As the charge coupled device sensor of the exemplary embodiment, one-dimensional line sensors, which output color signals corresponding to a red color, a green color, and a blue color from the received reflected light, are disposed in a set including three lines. The imaging element 151 performs photoelectric conversion on the received reflected light for the respective colors and outputs the reflected light as the color signals corresponding to the respective colors. The color signals are referred to as image signals below.

Subsequently, an inner structure of the automatic document transport unit 122 will be described. The automatic document transport unit 122 includes a path, that is, a document transport path 124 for transporting the document M, which is extracted one by one from the document tray 123, at the fixed speed.

The document transport path 124 prescribes a path until the document M extracted from the document tray 123 is discharged to the document cover 121 after passing through a surface of the scanning window 131.

The document transport path 124 includes a plurality of transport rollers 125 that transport the document M, a guide 126 that guides the document M, a scanning guide member 127 that fixedly maintains a distance between the document M, which is being transported, and the scanning window 131, a discharge guide member 128 that guides the document M which passes the scanning window 131 in a discharge direction, a detection sensor Sn1 that detects whether or not the document M exists in the document tray 123, and a detection sensor Sn2 that detects passage of the document M.

Figure 3:
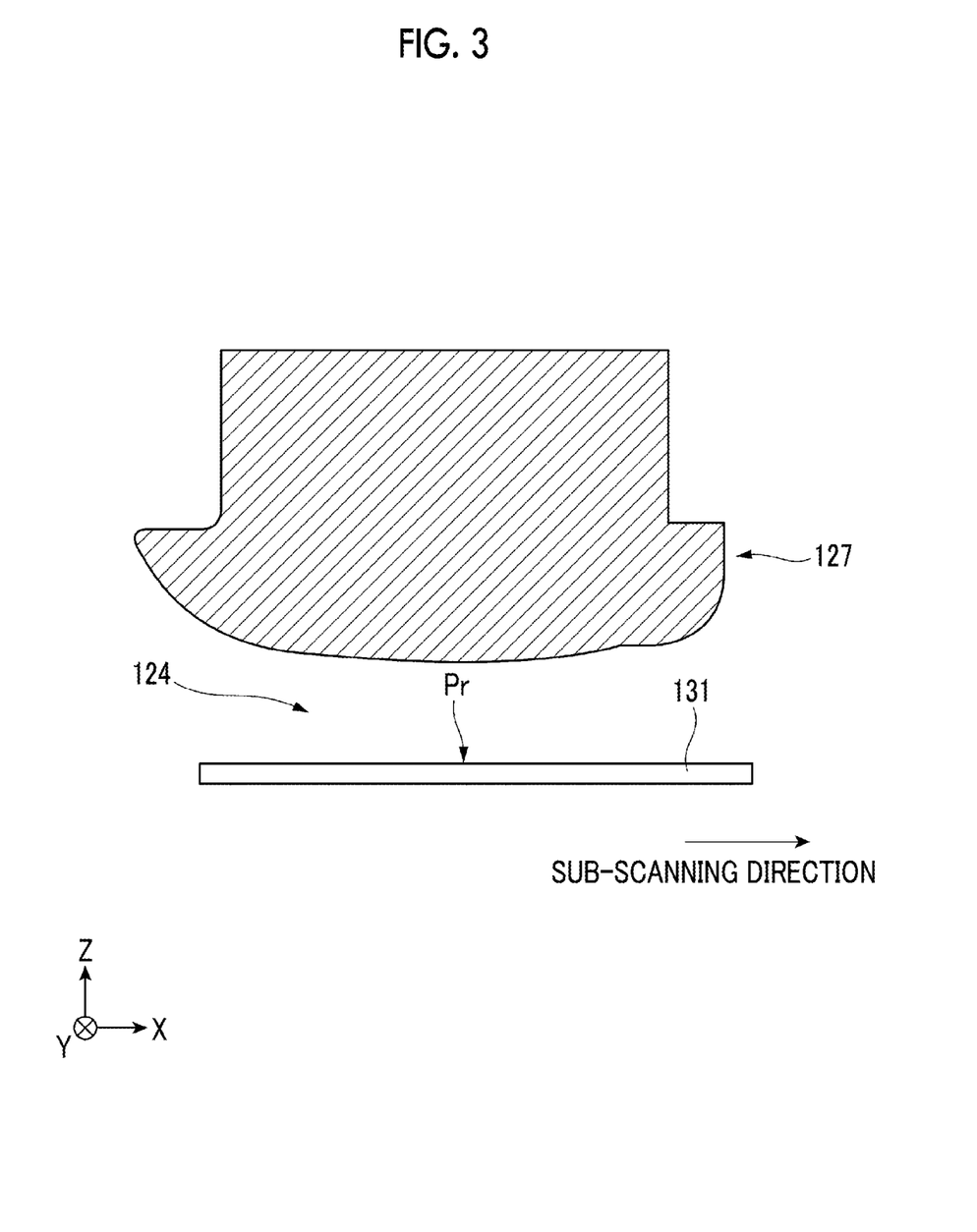
FIG. 3 is an enlarged diagram illustrating a vicinity of a scanning window used in a case where the information is scanned from the document transported at the fixed speed.

FIG. 3 is an enlarged diagram illustrating a vicinity of the scanning window 131 used in a case where the information is scanned from the document M transported at the fixed speed.

In a case of the exemplary embodiment, a position, which is used to scan the information from the document M which is being transported, is referred to as a scanning position Pr. The scanning position Pr is disposed on a surface side of the scanning window 131, that is, in the document transport path 124. In a case of FIG. 3, the scanning position Pr is determined at an approximately center of a width of the scanning window 131 in the sub-scanning direction.

The scanning guide member 127 is a component disposed over the scanning position Pr for guiding the document M transported along the document transport path 124. In a case of the exemplary embodiment, a part, which faces the scanning window 131, of a surface of the scanning guide member 127 has a curved shape so as to protrude in a direction of the scanning window 131.

The scanning guide member 127 of the exemplary embodiment is a component to which a dedicated background reflection plate prepared to detect the dirt, such as dust, is not attached. Therefore, the surface of the scanning guide member 127 becomes a reflection surface of the illumination light without change. Reflection properties of the scanning guide member 127 depend on a material, a color, a surface processing state, or the like of the scanning guide member 127.

Obviously, while the document M is being transported, the illumination light emitted from the light source 141 (see FIG. 2) is reflected in the document M. Accordingly, the illumination light is reflected in the surface of the scanning guide member 127 in a case where the illumination light from the light source 141 is incident to the surface of the scanning guide member 127 in time in which the document M does not pass through the scanning position Pr.

Configuration of Control System

Figure 4:
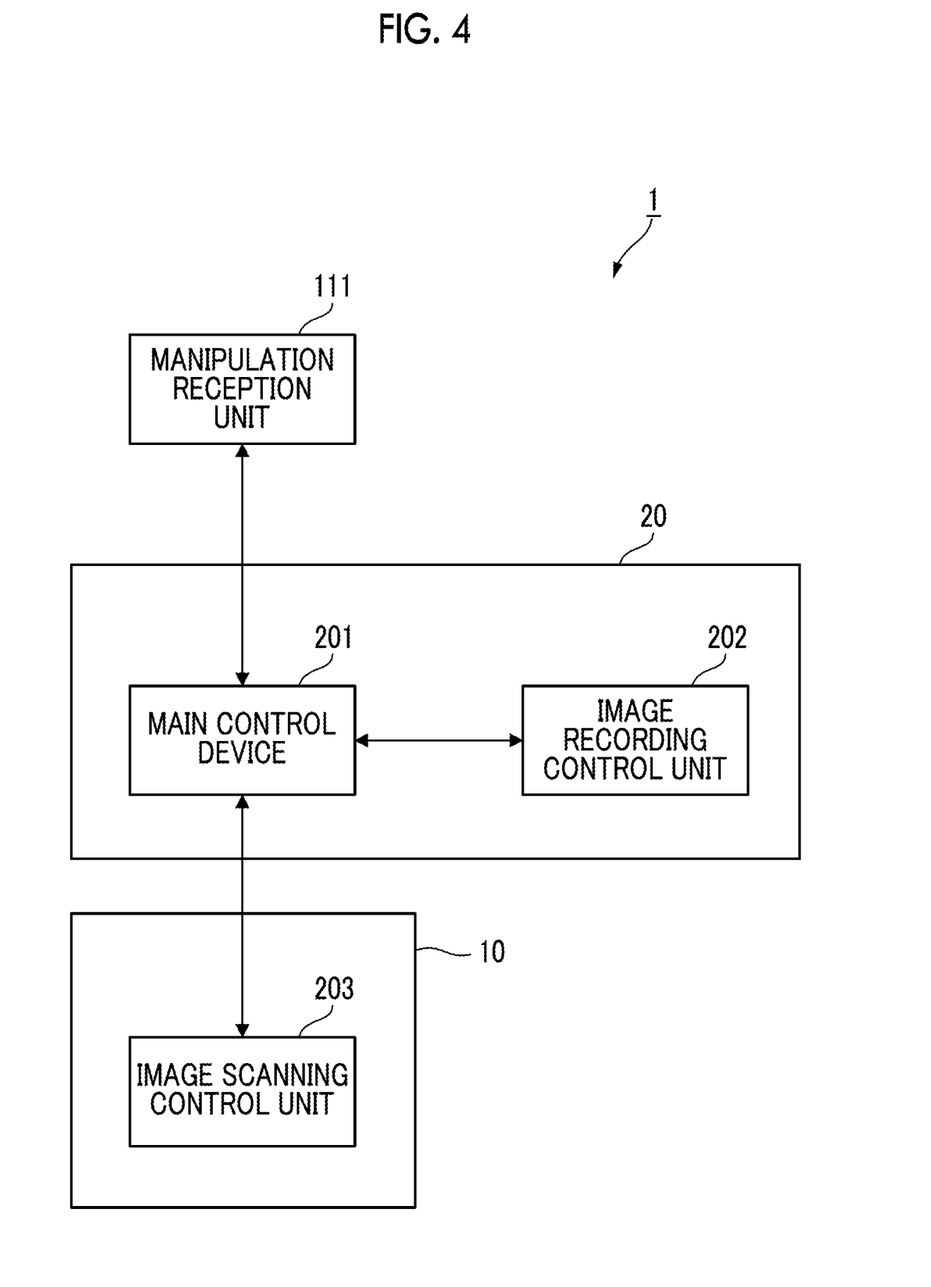
FIG. 4 is a block diagram illustrating an example of a configuration of a control system of the image forming apparatus.

FIG. 4 is a block diagram illustrating an example of a configuration of a control system of the image forming apparatus 1.

The control system of the image forming apparatus 1 includes a main control device 201 that controls a whole operation of the apparatus based on the instruction, which is received through the manipulation reception unit 111, of the user, an image recording control unit 202 that controls an operation of the image recording device 20 based on an instruction from the main control device 201, and an image scanning control unit 203 that controls an operation of the document scanning device 10 based on the instruction from the main control device 201.

In a case of FIG. 4, the main control device 201 and the image recording control unit 202 are embedded in the image recording device 20, and the image scanning control unit 203 is embedded in the document scanning device 10. However, the main control device 201 may be embedded in the document scanning device 10. In addition, the main control device 201, the image recording control unit 202, and the image scanning control unit 203 may be embedded in any of the document scanning device 10 or the image recording device 20. First of all, division may be performed on a function of the image scanning control unit 203, some of the functions may be embedded in the document scanning device 10, and remaining functions may be embedded in the image recording device 20.

Figure 5:
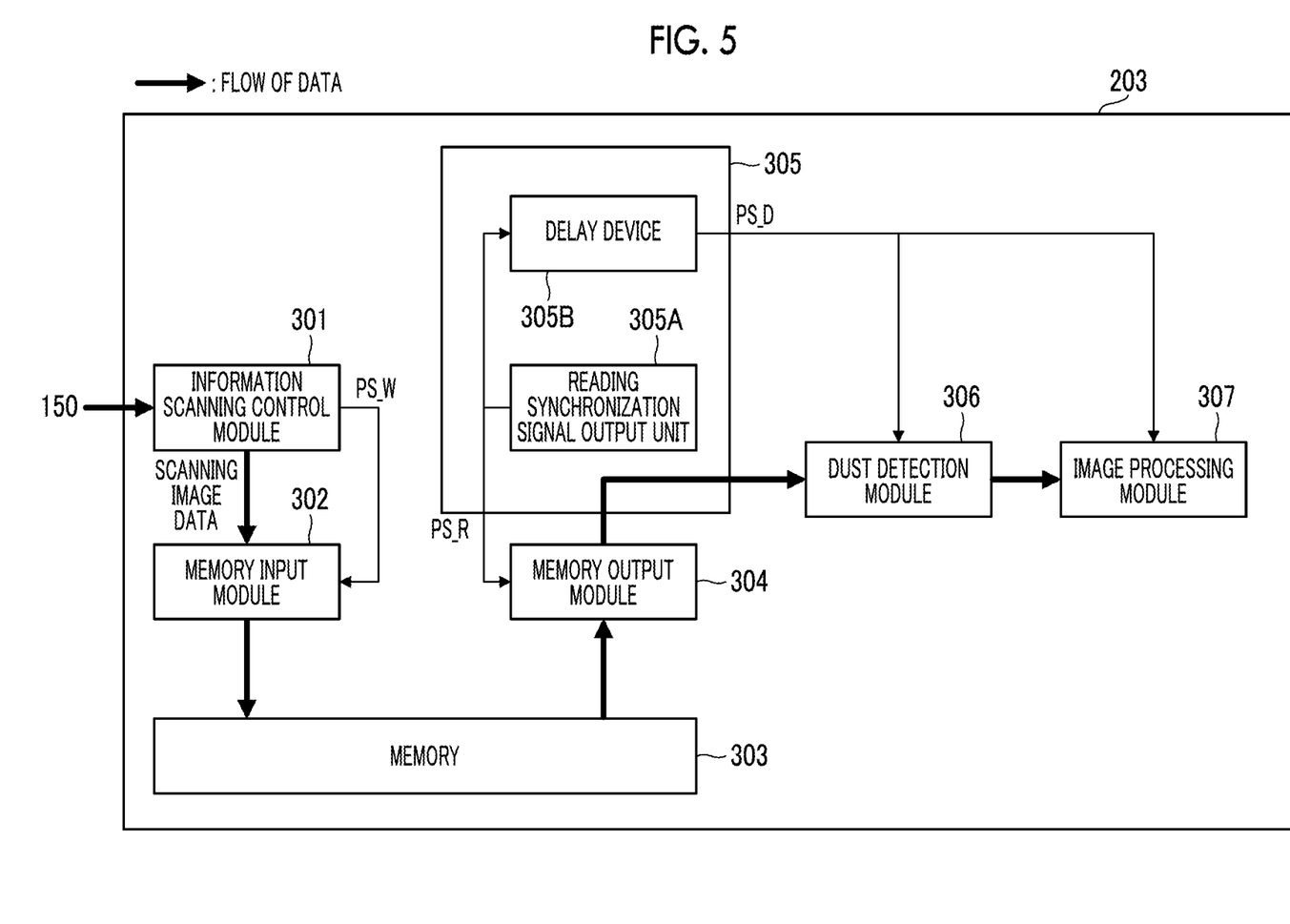
FIG. 5 is a block diagram illustrating an example of a configuration of an image scanning control unit.

FIG. 5 is a block diagram illustrating an example of a configuration of the image scanning control unit 203.

The image scanning control unit 203 of the exemplary embodiment includes an information scanning control module 301, a memory input module 302, a memory 303, a memory output module 304, a synchronization signal control unit 305, a dust detection module 306, and an image processing module 307.

The information scanning control module 301 of the exemplary embodiment performs a process for converting the image signal provided from the light reception unit 150 (see FIG. 2) into scan image data, a process for generating a synchronization signal which provides a timing at which the generated scan image data is written in the memory 303, and the like. Here, the image signal is an analog signal, and the scan image data is a digital signal.

The synchronization signal generated by the information scanning control module 301 includes a page sync signal PS (hereinafter, referred to as a "writing page sync signal PS_W") for providing a timing at which writing of the scan image data starts, and a line sync signal LS for providing a head of line data.

Figure 6:
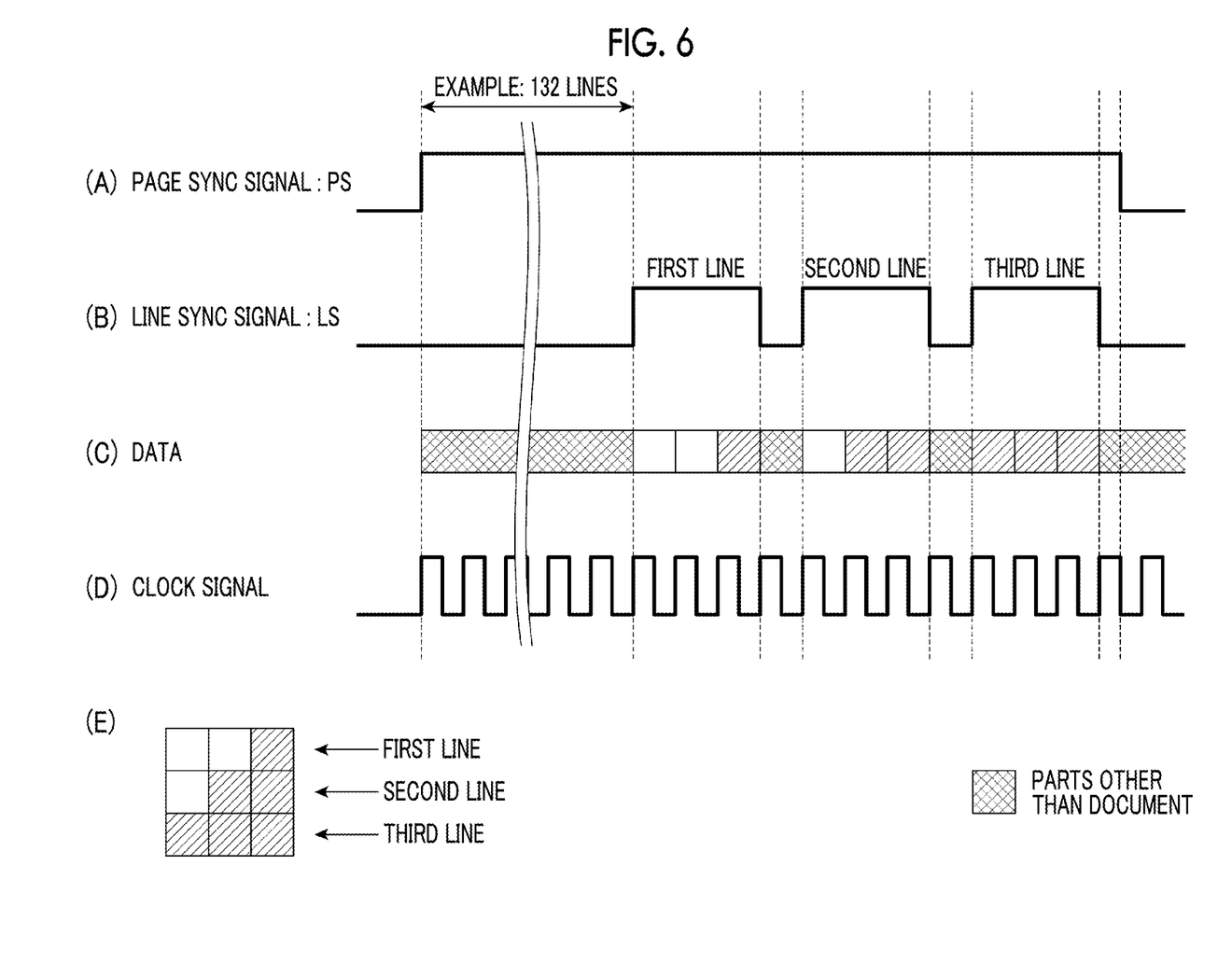
FIG. 6 is a diagram illustrating a page sync signal and a line sync signal.

FIG. 6 is a diagram illustrating the page sync signal PS and the line sync signal LS. Apart (A) of FIG. 6 illustrates a waveform of the page sync signal PS, a part (B) of FIG. 6 illustrates a waveform of the line sync signal LS, a part (C) of FIG. 6 illustrates a gradation value of the data, a part (D) of FIG. 6 illustrates a clock signal in pixel units, and a part (E) of FIG. 6 illustrates an image of a reconstructed image.

Examples illustrated in FIG. 6 supposes a case where an image of the document M is formed by 3 pixels×3 lines. The pixel provides a scanning unit of the gradation value in the main scanning direction, and the line provides the scanning position of the document M in the sub-scanning direction.

In the case of FIG. 6, the page sync signal PS provides a range which includes image data of one piece of document M and dust detection image data, which is acquired before the scanning starts, and the line sync signal LS provides a range of data corresponding to each line position of the document M in the scan image data.

Although 132 lines are assumed in the sub-scanning direction as the image data which is used to detect the dust or the like in FIG. 6, here, it is apparent that the number of lines is an example.

In the cases of FIG. 6, a period, during which the waveform of the page sync signal PS rises, is referred to as a valid period, and a period, during which the waveform falls down, is referred to as an invalid period. The period is the same as in the line sync signal LS.

One cycle of the clock signal corresponds to a range of data corresponding to each pixel. In the case of FIG. 6, the data according to the gradation value is expressed using shade. However, actual data is provided using the gradation value.

In a case where the gradation value for each pixel, which is read according to the line sync signal LS, is arranged in a sequence, an image illustrated in the part (E) of FIG. 6 is reconstructed.

In a case of the exemplary embodiment in which a method for providing the scan image data to the dust detection module 306 (see FIG. 5) after the scan image data is once written in the memory 303 (see FIG. 5), the information scanning control module 301 generates the writing page sync signal PS_W at a timing according to the scanning mode.

In a case of the scanning mode in which the document M is transported in the automatic document transport unit 122 (see FIG. 1), the information scanning control module 301 (see FIG. 5) causes a waveform of the writing page sync signal PS_W to rise from a point of time before a head of the transported document M passes the scanning position Pr (see FIG. 3). Specifically, the writing page sync signal PS_W, which is output to the memory input module 302 rises before the 132 lines in which a leading end of the document M reaches the scanning position Pr.

Here, the scan image data equivalent to a period corresponding to the 132 lines indicates an image of the surface of the scanning window 131 (see FIG. 3) imaged using the scanning guide member 127 as a background. In a case of the exemplary embodiment, the dirt, such as the dust, which is attached to the surface of the scanning window 131, is detected using the image signal.

In contrast, in a case of the scanning mode in which the illumination unit 140 is relatively moved with respect to the document M disposed on the document stand 114 (see FIG. 2), the writing page sync signal PS_W rises at a timing immediately before the document M passes the document stand 114. The reason for this is that, in a case of the scanning mode, acquisition of the dust detection image data corresponding to the scanning window 131 is not performed.

Returning to description with reference to FIG. 5.

The information scanning control module 301 provides the scan image data generated from the image signal, the above-described writing page sync signal PS_W, and the like to the memory input module 302.

The memory input module 302 is a circuit which includes a driver or the like used to write the scan image data into the memory 303, and includes, for example, an Application Specific Integrated Circuit (ASIC). In a case of the exemplary embodiment, the writing page sync signal PS_W or the like is provided to the memory input module 302.

The memory 303 is, for example, a volatile semiconductor memory, or a recording medium in which a magnetic material is coated on a surface of a disk-shaped substrate. Here, the recording medium is also referred to as a magnetic disk. The memory 303 stores the dust detection image data and the image data corresponding to the document M as the scan image data.

The memory output module 304 is a circuit which includes a driver or the like used to read the scan image data from the memory 303, and includes, for example, a determination integrated circuit. In a case of the exemplary embodiment, a reading page sync signal PS_R or the like is provided to the memory output module 304 from the synchronization signal control unit 305. Here, the memory output module 304 is an example of a reading unit.

The reading page sync signal PS_R is controlled to have a rising waveform until the reading of the image data corresponding to the document M ends from start of the reading of the dust detection image data. Here, the reading page sync signal PS_R is an example of a reading synchronization signal.

The synchronization signal control unit 305 includes a reading synchronization signal output unit 305A that outputs the reading page sync signal PS_R which is provided to the memory output module 304, and a delay device 305B that outputs a delay page sync signal PS_D which is acquired by delaying the reading page sync signal PS_R as the number of lines equivalent to the dust detection image data.

In a case of the exemplary embodiment, time which is delayed by the delay device 305B is prescribed in advance. Here, the delay device 305B is an example of a delay unit.

Needless to say, a length of time in which the delay page sync signal PS_D rises is the same as a length of a period during which the reading page sync signal PS_R rises before the delay. Accordingly, even after output of the image data corresponding to the document M from the synchronization signal control unit 305 is completed, a state in which the delay page sync signal PS_D rises is continued.

Therefore, the synchronization signal control unit 305 of the exemplary embodiment is provided with a function of inserting white data until the delay page sync signal PS_D falls down from a point of time in which the output of the image data corresponding to the document M is completed.

Here, the white data is provided in a state in which each of the gradation values corresponding to red, green, and blue is 255. The white data is an example, and data which is inserted subsequent to a trailing end of the image data corresponding to the document M may be data which is different from the image data corresponding to the document M.

The dust detection module 306 detects the dirt, such as the dust, which is attached to the scanning window 131 (see FIG. 2), by targeting a period during which the delay page sync signal PS_D is invalid in the scan image data which is read by the memory output module 304. Here, the dust detection module 306 is an example of a detection unit.

Specifically, the dust detection module 306 detects existence or non-existence of the dirt of the scanning window 131 (see FIG. 2) due to the dust or the like by targeting the image data until before the scanning of the image data corresponding to the document M in the scan image data, which is read from the memory 303, starts. Incidentally, the dust detection image data, which is input before the delay page sync signal PS_D rises, is the image data which is necessary only in the dust detection module 306. Accordingly, the dust detection module 306 outputs the image data, which is acquired by removing the dust detection image data, in the input image data to the image processing module 307.

The image processing module 307 of the exemplary embodiment operates in synchronization with the delay page sync signal PS_D, and removes the white data included in the input image data.

In addition, the image processing module 307 adds a process for removing influence of the dirt detected in the dust detection module 306 to the image data corresponding to the document M. For example, a gradation value of a pixel corresponding to the dirt, such as the dust, is replaced by a gradation value interpolated based on peripheral pixels determined that the dirt, such as the dust, does not exist.

Here, the image processing module 307 is an example of a processing unit.

Example of Processing Operation

Figure 7:
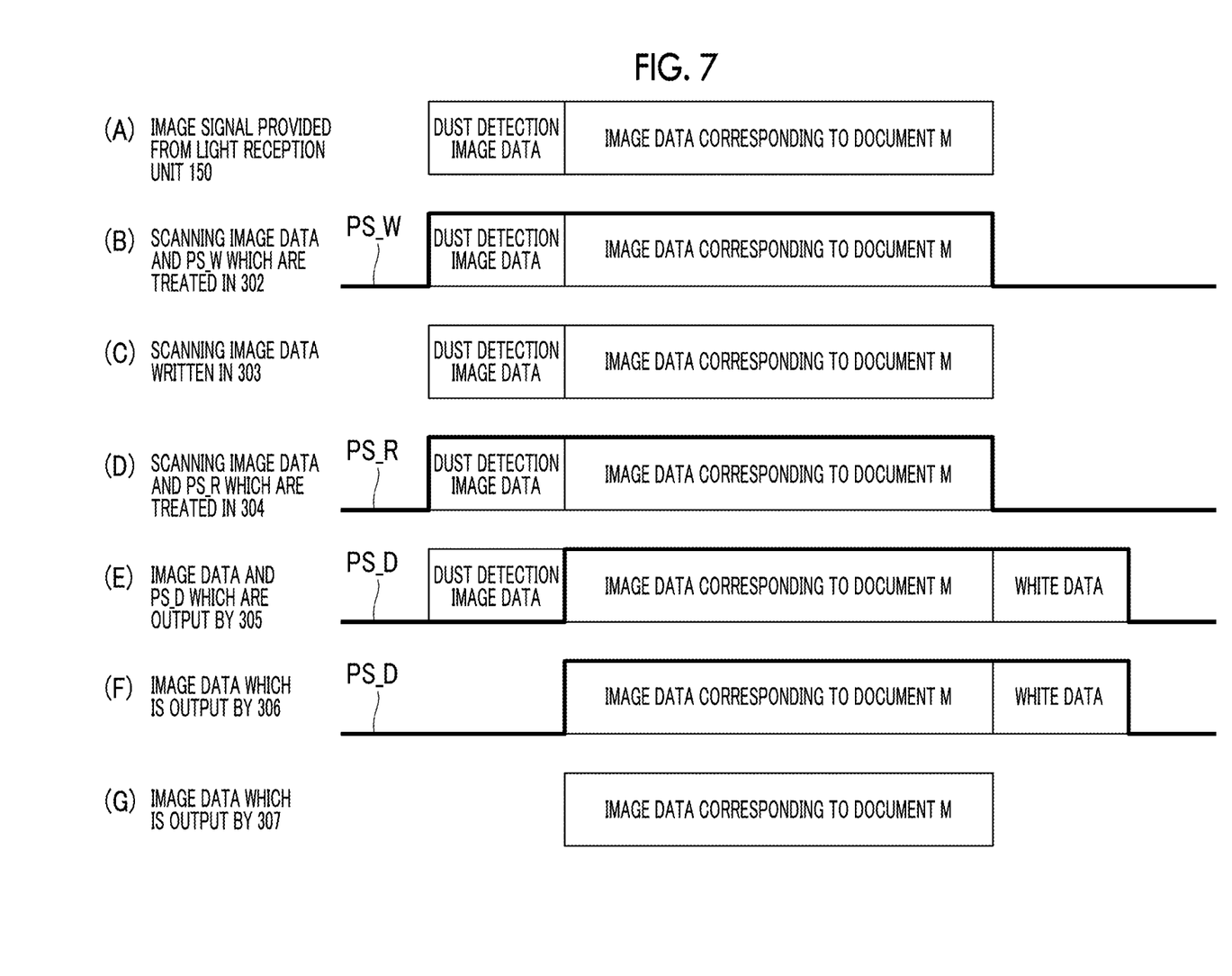

FIG. 7 is a diagram illustrating examples of image processing performed by the image scanning control unit 203 which is used in the exemplary embodiment. A part (A) of FIG. 7 illustrates an image signal provided from the light reception unit 150 (see FIG. 2), a part (B) of FIG. 7 illustrates the scan image data and the writing page sync signal PS_W which are treated in the memory input module 302, a part (C) of FIG. 7 illustrates the scan image data written in the memory 303, a part (D) of FIG. 7 illustrates the scan image data and the reading page sync signal PS_R which are treated in the memory output module 304, a part (E) of FIG. 7 illustrates the image data and the delay page sync signal PS_D which are output by the synchronization signal control unit 305, a part (F) of FIG. 7 illustrates the image data which is output by the dust detection module 306, and a part (G) of FIG. 7 illustrates the image data which is output by the image processing module 307.

As illustrated in the part (A) of FIG. 7, the image signal, which is provided from the light reception unit 150 to the information scanning control module 301 (see FIG. 5), includes a dust detection image signal and an image signal corresponding to the document M. As described above, the dust detection image signal is the image signal equivalent to the 132 lines before the leading end of the document M reaches the scanning window 131 (see FIG. 2).

Here, the image signal is converted into the digital signal by the information scanning control module 301. Specifically, the image signal is converted into the scan image data.

The scan image data includes the dust detection image data and the image data corresponding to the document M. As illustrated in the part (B) of FIG. 7, the writing page sync signal PS_W, which is provided to the memory input module 302, is controlled to be a rising state while the dust detection image data and the image data corresponding to the document M are processed.

Therefore, as illustrated in the part (C) of FIG. 7, the scan image data, which includes the dust detection image data and the image data corresponding to the document M, is stored in the memory 303.

The memory output module 304 reads the scan image data, which includes the dust detection image data and the image data corresponding to the document M, from the memory 303. Therefore, as illustrated in the part (D) of FIG. 7, a waveform of the reading page sync signal PS_R is controlled to be a rising state throughout a period required to read the dust detection image data and a period required to read the image data corresponding to the document M.

The image data, which is read in the memory output module 304, is output to the dust detection module 306 through the synchronization signal control unit 305. At this time, as illustrated in the part (E) of FIG. 7, the synchronization signal control unit 305 generates the delay page sync signal PS_D, which is acquired by delaying the reading page sync signal PS_R, outputs the delay page sync signal PS_D to the dust detection module 306, and inserts the white data to the trailing end of the image data corresponding to the document M by the delayed time. Therefore, the dust detection image data, the image data corresponding to the document M, and the white data are provided to the dust detection module 306.

The dust detection module 306 performs a process for detecting the existence or non-existence of the dirt, such as the dust, which is attached to the scanning window 131, a position of the dirt, and the like by targeting the image data in a period during which the delay page sync signal PS_D falls down.

As described above, the dust detection image data is not used at a rear stage of the dust detection module 306. Therefore, the image data, which is acquired by removing the dust detection image data, is output from the dust detection module 306. That is, as illustrated in the part (F) of FIG. 7, the image data corresponding to the document M and the white data are output from the dust detection module 306 to the image processing module 307.

Thereafter, the white data is removed in the image processing module 307. The image processing module 307 performs a process for removing influence of the dirt from the image data corresponding to the document M. Thus, as illustrated in the part (G) of FIG. 7, the image processing module 307 outputs the image data corresponding to the document M.

Another Exemplary Embodiment

Hereinabove, although the exemplary embodiment of the present invention is described, a technical scope of the present invention is not limited to a range disclosed in the above-described exemplary embodiment. It is apparent that various changes or improvements of the above-described exemplary embodiment are included in the technical scope of the present invention from the claims.

For example, in the above-described exemplary embodiment, a case where the dedicated background reflection plate is not attached to the scanning guide member 127 is described. However, the dedicated background reflection plate may be attached to the surface of the scanning guide member 127.

In this case, for example, the dedicated background reflection plate is disposed at a bottom surface part of a depression formed around a center of a surface in the sub-scanning direction, the surface being curved so as to protrude in the direction of the scanning window 131. The bottom surface of the depression forms a surface which is slightly lower than the curved surface in a case of being viewed from the scanning window 131. The background reflection plate is attached to the bottom surface of the depression which is formed to incline with respect to the scanning window 131. More specifically, the background reflection plate is attached to incline such that a discharge side of the document M is further separated from the document transport path 124 of the document M. Due to the inclination, contact between the background reflection plate and the document M which is being transported is suppressed. In other words, the background reflection plate is suppressed from being dirty. A maximum value of a distance between the background reflection plate and the scanning window 131 is, for example, 1 mm to 5 mm.

The background reflection plate is formed to reflect much light rather than a case where the document M of a color of white is transported. For example, reflectivity of the background reflection plate is designed such that the quantity of light received in the imaging element 151 is saturated. The background reflection plate is formed of, for example, a member, such as aluminum, which has high reflectivity.

In the above-described exemplary embodiment, the image forming apparatus 1, which has a device configuration in which the document scanning device 10 is connected to the image recording device 20, is described. However, the document scanning device 10 may be a single device. In addition, in the above-described exemplary embodiment, a case where the image, which is scanned in the document scanning device 10, is recorded on the medium, such as the paper, in the image recording device 20 without change is described. However, the scanned image may be transmitted through a facsimile or may be preserved in an inner storage area or a storage area of an external apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image scanning apparatus comprising:
a memory and a processor, the processor being configured to:
read image data from the memory in synchronization with a reading synchronization signal, wherein the image data comprises an image of a document transported along a transport path and an image at a scanning position of the image of the document;
detect a dirt at the scanning position by processing the image data; and
delay and output a period, during which a period of the synchronization signal to be provided is valid, until reading of data of the document transported along the transport path included in the image data starts, wherein a length of the period is the same as a length of the valid period of the synchronization signal to be provided.

2. The image scanning apparatus according to claim 1, wherein data, which is output from the detection of the processor, includes data, which is different from the data of the document transported along the transport path, at a trailing end of the image data while the period of the synchronization signal acquired after being delayed is valid.

3. The image scanning apparatus according to claim 2, wherein the processor is configured to remove the data, which is different from the data of the document transported along the transport path, from the data which is output from the detection of the processor.

4. The image scanning apparatus according to claim 3, wherein the processor is configured to remove influence of the dirt, which is detected by the detection of the processor, from the data of the document transported along the transport path.

5. The image scanning apparatus according to claim 2, wherein the processor is configured to output data after removing a data part corresponding to the period during which the period of the synchronization signal is not valid.

6. The image scanning apparatus according to claim 1, wherein the image data is scanned in the period before a leading end of the document which is being transported along the transport path reaches the scanning position until a trailing of the document passes the scanning position.

7. The image scanning apparatus according to claim 6, wherein the image data is scanned from the document which is transported along the transport path at a speed determined in advance.

8. An image scanning apparatus comprising:

reading means for reading image data, from a memory in synchronization with a reading synchronization signal, wherein the image data comprises an image of a document transported along a transport path and an image at a scanning position of the image of the document;

detection means for detecting a dirt at the scanning position by processing the image data; and delay means for delaying and outputting a period, during which a period of the synchronization signal to be provided is valid, until reading of data of the document transported along the transport path included in the image data starts, wherein a length of the period is the same as a length of the valid period of the synchronization signal to be provided.

* * * * *